(12) United States Patent
Riebensahm

(10) Patent No.: US 7,914,676 B2
(45) Date of Patent: Mar. 29, 2011

(54) METHOD FOR REMOVING SULPHATE AND HEAVY METALS FROM WASTE WATER

(75) Inventor: Michael Riebensahm, Santiago (CL)

(73) Assignee: Siemens Aktiengesellschaft, Munich (DE)

(*) Notice: Subject to any disclaimer, the term of this patent is extended or adjusted under 35 U.S.C. 154(b) by 167 days.

(21) Appl. No.: 12/377,229

(22) PCT Filed: Aug. 10, 2007

(86) PCT No.: PCT/EP2007/058294
§ 371 (c)(1),
(2), (4) Date: Feb. 11, 2009

(87) PCT Pub. No.: WO2008/019993
PCT Pub. Date: Feb. 21, 2008

(65) Prior Publication Data
US 2010/0176055 A1    Jul. 15, 2010

(30) Foreign Application Priority Data
Aug. 16, 2006 (DE) .................. 10 2006 038 207

(51) Int. Cl.
C02F 3/28 (2006.01)
C02F 3/34 (2006.01)
(52) U.S. Cl. ......... 210/603; 210/631; 210/259; 210/912
(58) Field of Classification Search ............. 210/603, 210/631, 252, 259, 912, 913, 914
See application file for complete search history.

(56) References Cited

U.S. PATENT DOCUMENTS

| | | | |
|---|---|---|---|
| 4,519,912 A | 5/1985 | Baldwin | |
| 4,522,723 A | 6/1985 | Kauffman | |
| 5,062,956 A * | 11/1991 | Lupton et al. | 210/611 |
| 5,587,079 A | 12/1996 | Piroshco | |
| 5,968,359 A * | 10/1999 | Krahn et al. | 210/601 |
| 6,203,700 B1 * | 3/2001 | Rose et al. | 210/602 |
| 6,228,263 B1 | 5/2001 | O'Connor | |
| 6,325,923 B1 | 12/2001 | Manchester | |
| 7,279,103 B2 * | 10/2007 | Burckle et al. | 210/610 |

FOREIGN PATENT DOCUMENTS
DE      3041460 C2    10/1990
WO    WO 2005063632 A1    7/2005

OTHER PUBLICATIONS

International Search Report, PCT/EP2007/058294, 11 pages, Dec. 19, 2007.
German Office Action, German application No. 10 2006 038 207.2-47, 5 pages, May 15, 2007.

* cited by examiner

*Primary Examiner* — Fred Prince
(74) *Attorney, Agent, or Firm* — King & Spalding L.L.P.

(57) ABSTRACT

In a method for removing sulphate and heavy metals from waste water: a) in a first treatment step (I) hydrogen sulphide is guided through the waste water, heavy metals that are present in the waste water are precipitated as sulphide, and are removed from the waste water, b) in a second treatment step (II), calcium sulphate is precipitated from the waste water by adding a precipitation auxiliary agent, c) the calcium sulphate is removed in the second treatment step (II) and one part thereof is guided to a third treatment step (III) in which sulphate is converted into hydrogen sulphide with the aid of sulphate-reducing bacteria, d) hydrogen sulphide formed in the third treatment step (III) is guided back to the first treatment step (I).

12 Claims, 1 Drawing Sheet

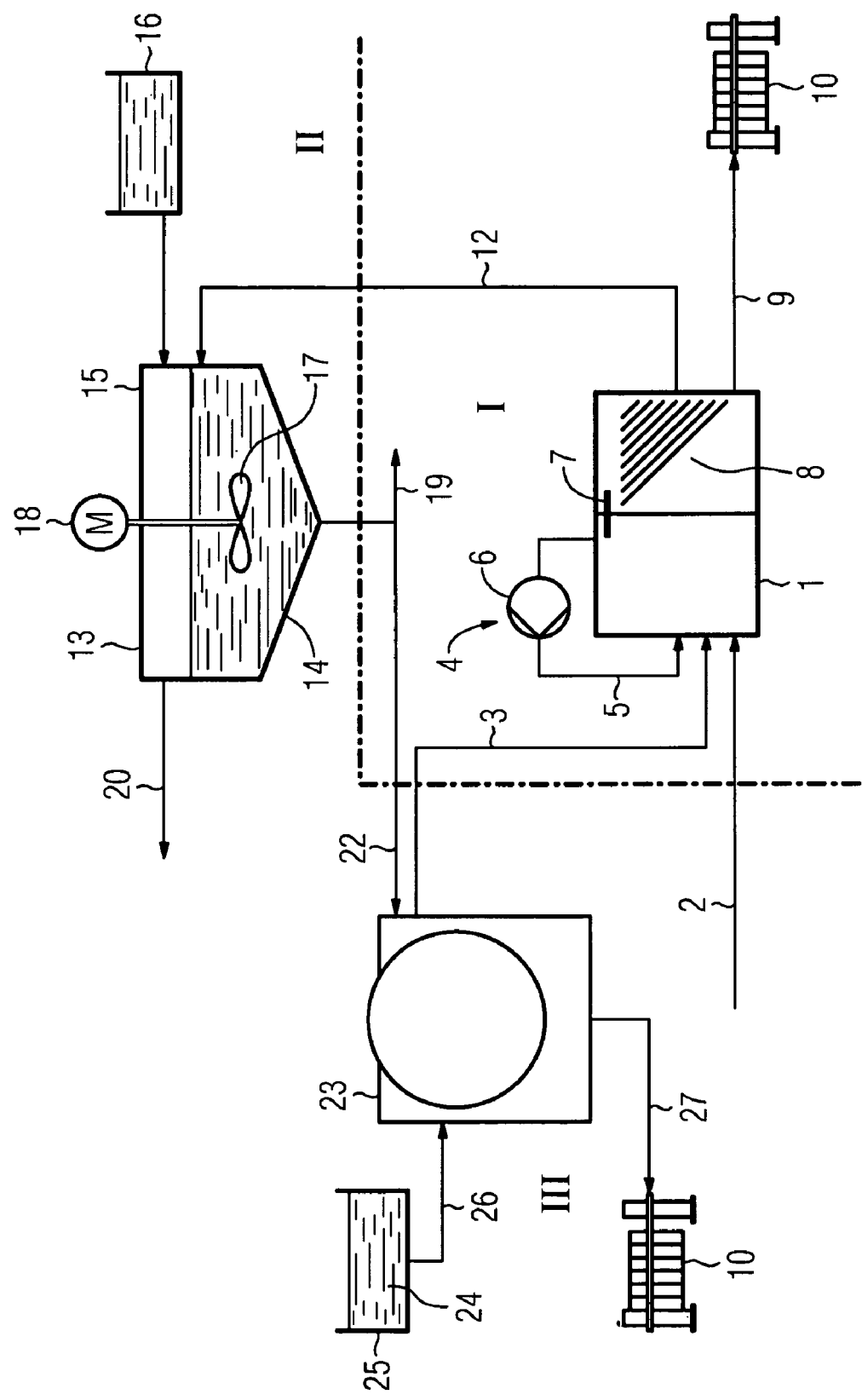

_US 7,914,676 B2_

METHOD FOR REMOVING SULPHATE AND HEAVY METALS FROM WASTE WATER

CROSS-REFERENCE TO RELATED APPLICATIONS

This application is a U.S. National Stage Application of International Application No. PCT/EP2007/058294 filed Aug. 10, 2007, which designates the United States of America, and claims priority to German Application No. 10 2006 038 207.2 filed Aug. 16, 2006, the contents of which are hereby incorporated by reference in their entirety.

TECHNICAL FIELD

The invention relates to a method for processing waste waters containing sulfate and heavy metals.

BACKGROUND

Such waste waters are produced in large amounts, in particular, in mining during transport, refining and extraction of metal ores. Conventionally, sulfate is precipitated out of such waste waters as calcium sulfate by pH reduction and addition of a precipitant such as milk of lime, and removed from the waste water using sedimentation tanks or filter stages. Owing to the heavy metal content of the waste waters, the sulfate sludges must be treated as special waste and stored in special landfills at high expense. U.S. Pat. No. 5,587,079 discloses a method in which the heavy metals are precipitated out by introducing hydrogen sulfide and are separated off. Some of the sulfate-containing water is fed to a bioreactor in which sulfate is converted to $H_2S$ using sulfate-reducing bacteria, which $H_2S$ is used for the precipitation of heavy metals. Excess sulfate is converted to $H_2S$ in the bioreactor, wherein this is reacted to form metal sulfides. A disadvantage of this method is, especially, that the total amount of waste water must be passed through the bioreactor in order to separate off all of the sulfate contained therein. This requires not only a very large bioreactor having corresponding operating and service expenditure, but in addition further method steps and corresponding apparatuses for reacting the hydrogen sulfide generated to form metal sulfides. A further disadvantage is that in the case of large amounts of sulfate, a correspondingly large amount of metal sulfides is formed which are in addition to the metal sulfides which are precipitated out of the waste water containing heavy metals. Therefore, in total a very large amount of metal sulfides is produced which, in the lack of possibilities for reutilization lead to considerable problems of disposal and/or landfill. For instance, there is the risk, for example, that on contact with acidic water, hydrogen sulfide is expelled from the sulfides.

SUMMARY

According to various embodiment, an alternative processing method for waste water containing sulfate and heavy metals can be proposed, by which method, in particular said disadvantages can be avoided.

According to an embodiment, a method of removing sulfate and heavy metals from waste water may comprise the following steps: a) in a first treatment stage, hydrogen sulfide is passed through the waste water, wherein heavy metals present in the waste water are precipitated out as sulfides and removed from the waste water, b) in a second treatment stage, calcium sulfate is precipitated out of the waste water by addition of a precipitant, c) the calcium sulfate is removed from the second treatment stage and a part thereof is fed to a third treatment stage in which sulfate is converted to hydrogen sulfide with the aid of sulfate-reducing bacteria, d) hydrogen sulfide which is formed in the third treatment stage is fed to the first treatment stage.

According to a further embodiment, the precipitant used may be calcium aluminate. According to a further embodiment, calcium sulfate can be fed to the third treatment stage until at least an amount of hydrogen sulfide required for the stoichiometric reaction of the heavy metals contained in the waste water is formed. According to a further embodiment, a hydrogen sulfide excess of 20 mol % may be employed.

BRIEF DESCRIPTION OF THE DRAWINGS

The invention will now be described in more detail with reference to the accompanying drawing which shows a flow diagram of a method according to an embodiment.

DETAILED DESCRIPTION

According to an embodiment, in a method in which, in a first treatment stage, hydrogen sulfide is passed through the waste water. In this process heavy metals present in the waste water, such as copper, iron or manganese, are precipitated out as sulfides and removed from the waste water before, in a second treatment stage, calcium sulfate is precipitated out of the waste water by addition of a precipitant. This procedure has the advantage that the separation of the sulfate from the waste water can proceed essentially only in a single step, if appropriate with downstream connection of filtering for separating off residual water. In contrast, separating off sulfate in the known method requires at least two steps, namely passing virtually all of the amount of waste water through the bioreactor and subsequent reaction to form metal sulfides, which obviously requires the use of corresponding salts, that is an additional expenditure on chemicals. In contrast to metal sulfides, precipitated calcium sulfate (gypsum) can be utilized in the construction industry as additive for production of bricks or as binder. It is further advantageous that in the proposed method only a relatively small bioreactor is required since it serves exclusively for generating the amount of hydrogen sulfide required for precipitating out the heavy metals present in the waste water.

The respective amount of hydrogen sulfide required may be controlled in a simple manner by the amount of calcium sulfate fed to the third treatment stage, namely in such a manner that stoichiometric fractions of sulfides and heavy metal ions are present. In order, for example, in the case of fluctuating heavy metal contents, to reduce the expenditure on analysis, an excess of hydrogen sulfide, in particular 20 mol %, can be employed, compared with the stoichiometric amount. In the case of lower heavy metal contents, unused hydrogen sulfide can, for example, be temporarily stored, in order to be reused when required.

The precipitant used is preferably calcium aluminate. The use of sodium aluminate is also conceivable according to a further embodiment.

For the waste water treatment method in question, essentially in total three treatment stages are required which are characterized by I-III in the drawing. A waste water to be purified is first fed to the treatment stage I. This comprises a reactor 1 for treating the waste water with hydrogen sulfide. The reactor 1 is charged with waste water via a line 2. Via a line 3, hydrogen sulfide is fed to the reactor 1 at a position lying in its bottom region. In order to distribute the hydrogen sulfide as finely as possible in the waste water, a circulation appliance 4 is present. This comprises a circulation line 5 which branches off in the lid region of the reactor and opens out into the reactor 1 at a lower position, in which circulation line a pump 6 is arranged. This circulates the waste water at high velocity, wherein strong turbulence occurs within the reactor 1, which turbulence promotes mixing of the reactants. Heavy metal sulfides formed by introducing hydrogen sulfide are conducted upward by the flow of the waste water and pass via an outlet 7 arranged in the region adjacent to the lid into a filter unit 8 which is arranged downstream of the reactor 1. Here, the heavy metal sulfides are filtered out of the waste water. In the bottom region of the filter unit 8, primary sludge containing heavy metal sulfide is taken off via a line 9 and subjected to a filtration, for example using a plate filter press 10. The filtrate and/or waste water purified of heavy metal sulfides is withdrawn from the filter unit 8 via a line 12 and fed to the treatment stage II.

The treatment stage II comprises a settling container 13 having a funnel- or wedge-shaped bottom 14. At a position close to the top 15 of the settling container 13, the line 12 coming from the filter unit 8 opens out into the settling container 13. From a storage container 16, calcium aluminate as precipitant is introduced into the settling container 13. To accelerate the precipitation process, a stirrer appliance 17 is present in the settling container 13, which stirrer appliance is driven by a motor 18. The precipitated calcium sulfate, when the stirrer appliance 17 is still, collects at the bottom 14 of the settling container 13 and is taken off as secondary sludge via a line 19 whereas waste water essentially freed from sulfate is withdrawn via a line 20 which is arranged close to the top 15. A part of the secondary sludge is fed to the treatment stage III via a line 22 which branches off from the line 19.

The treatment stage III is formed essentially by a bioreactor 23 in which sulfate is converted to hydrogen sulfide in a manner known per se using sulfate-reducing bacteria. In order that this conversion can take place, anoxic conditions are maintained in the bioreactor 23. Reaction of the sulfate to form hydrogen sulfide requires an electron donor or a carbon source. This is fed to the bioreactor 23 in the form of organically polluted waste water 24 via a storage container 25 and a line 26. Hydrogen sulfide and carbon dioxide form as reaction products of the microbiological metabolic processes.

The reactor 1 of treatment stage I is charged with this gas mixture via the line 3. By means of the reactions in the bioreactor 23, solids especially of organic nature are formed which, via a line 27 which opens out in a region close to the bottom of the bioreactor 23, are fed to a filter unit, for instance likewise a filter plate 10. The filtrate can if appropriate be recirculated to the bioreactor 23.

What is claimed is:

1. A method of removing sulfate and heavy metals from waste water comprising the following steps:
    a) in a first treatment stage, hydrogen sulfide is passed through the waste water, wherein heavy metals present in the waste water are precipitated out as sulfides and removed from the waste water,
    b) in a second treatment stage, calcium sulfate is precipitated out of the waste water by addition of a precipitant,
    c) the calcium sulfate is removed from the second treatment stage and a part thereof is fed to a third treatment stage in which sulfate is converted to hydrogen sulfide with the aid of sulfate-reducing bacteria,
    d) hydrogen sulfide which is formed in the third treatment stage is fed to the first treatment stage.

2. The method as claimed in claim 1, wherein the precipitant used is calcium aluminate.

3. The method as claimed in claim 1, wherein calcium sulfate is fed to the third treatment stage until at least an amount of hydrogen sulfide required for the stoichiometric reaction of the heavy metals contained in the waste water is formed.

4. The method as claimed in claim 3, wherein a hydrogen sulfide excess of 20 mol % is employed.

5. A method of removing sulfate and heavy metals from waste water comprising the following steps:
    a) in a first treatment stage, passing hydrogen sulfide through the waste water,
    b) in a second treatment stage, adding of a precipitant capable of precipitating calcium sulfate out of the waste water,
    c) removing the calcium sulfate and feeding a part thereof to a third treatment stage in which sulfate is converted to hydrogen sulfide with the aid of sulfate-reducing bacteria,
    d) feeding hydrogen sulfide which is formed in the third treatment stage to the first treatment stage.

6. The method as claimed in claim 5, wherein the precipitant used is calcium aluminate.

7. The method as claimed in claim 5, wherein calcium sulfate is fed to the third treatment stage until at least an amount of hydrogen sulfide required for the stoichiometric reaction of the heavy metals contained in the waste water is formed.

8. The method as claimed in claim 7, wherein a hydrogen sulfide excess of 20 mol % is employed.

9. A system for removing sulfate and heavy metals from waste water comprising:
    a) a first treatment stage operable to pass hydrogen sulfide through the waste water, wherein heavy metals present in the waste water are precipitated out as sulfides and removed from the waste water,
    b) a second treatment stage operable to precipitate calcium sulfate out of the waste water by addition of a precipitant,
    c) wherein the calcium sulfate is removed from the second treatment stage and a part thereof is fed to a third treatment stage in which sulfate is converted to hydrogen sulfide with the aid of sulfate-reducing bacteria,
    d) wherein hydrogen sulfide which is formed in the third treatment stage is fed to the first treatment stage.

10. The system as claimed in claim 9, wherein the precipitant used is calcium aluminate.

11. The system as claimed in claim 9, wherein calcium sulfate is fed to the third treatment stage until at least an amount of hydrogen sulfide required for the stoichiometric reaction of the heavy metals contained in the waste water is formed.

12. The system as claimed in claim 11, wherein a hydrogen sulfide excess of 20 mol % is employed.

* * * * *